May 13, 1924.
M. J. FURLONG
VEHICLE
Filed May 9, 1921
1,493,625
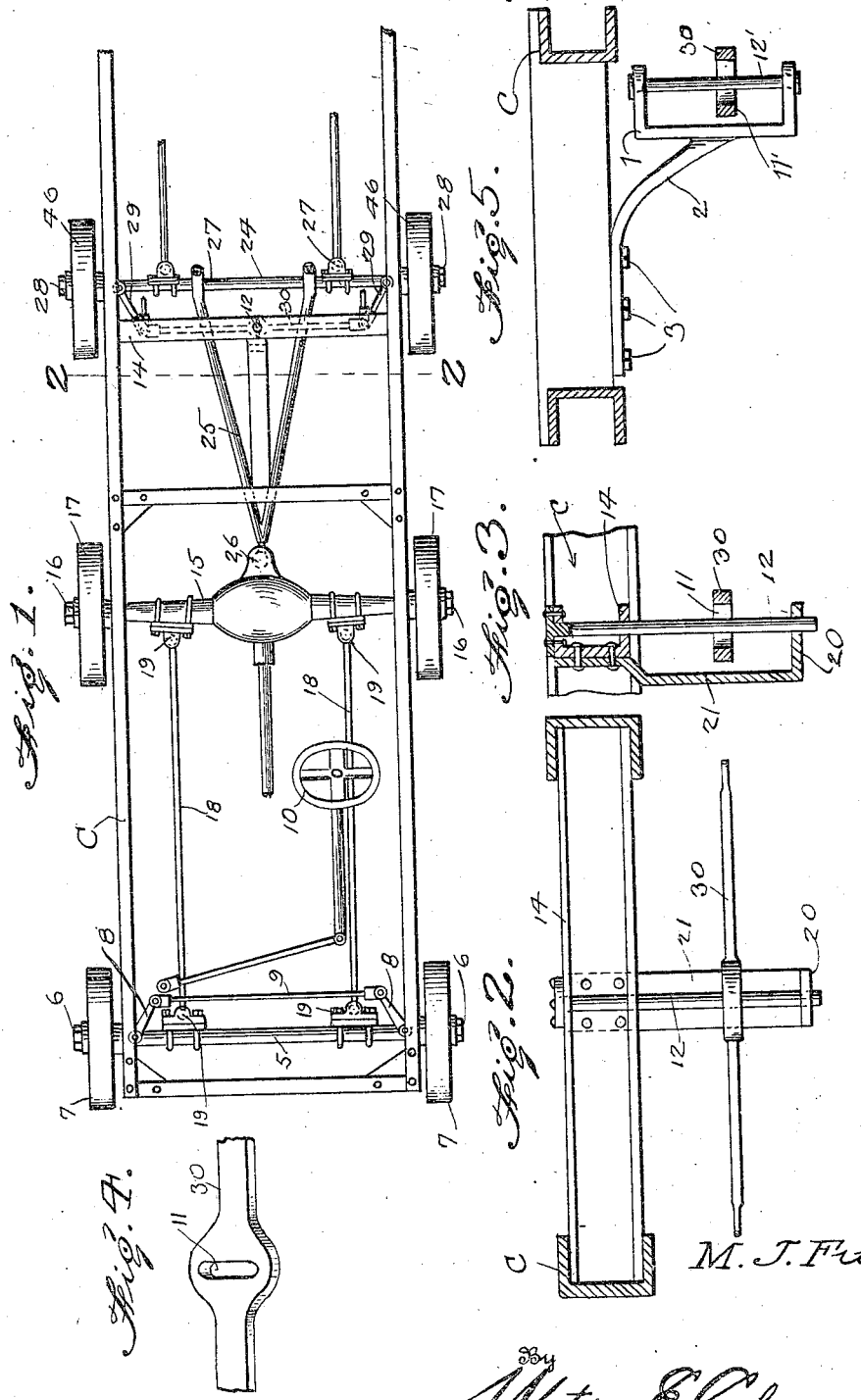

Patented May 13, 1924.

1,493,625

UNITED STATES PATENT OFFICE.

MARTIN J. FURLONG, OF HOUSTON, TEXAS.

VEHICLE.

Application filed May 9, 1921. Serial No. 467,968.

*To all whom it may concern:*

Be it known that I, MARTIN J. FURLONG, a citizen of the United States, residing at Houston, in the county of Harris and State of Texas, have invented certain new and useful Improvements in Vehicles, of which the following is a specification, reference being had to the accompanying drawings.

This invention relates to certain improvements in vehicles, and it is primarily an object of the invention to provide a device of this general character having novel and improved means whereby the proper turning or steering of the vehicle is facilitated.

Another object of the invention is to provide a device of this general character embodying a novel wheel base including three or more axles provided with ground engaging wheels, the wheels of certain of the axles being laterally movable in one direction and the wheels of other of the axles being laterally movable in the opposite direction and under the influence of the body of the vehicle during the steering or turning operation.

The invention consists in the details of construction and in the combination and arrangement of the several parts of my improved vehicle whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in top plan and of a somewhat diagrammatic character illustrating an embodiment of my invention, Figure 2 is a transverse sectional view taken substantially on the line 2—2 of Figure 1 with certain of the parts omitted, Figure 3 is a fragmentary view partly in side elevation and partly in section illustrating the structure particularly disclosed in Figure 2.

Figure 4 is a fragmentary view in perspective of the central portion of one of the steering rods herein embodied and with which the body cooperates, and Figure 5 is a fragmentary view partly in side elevation and partly in section illustrating another embodiment of my invention.

As is particularly illustrated in Figures 1 to 4 inclusive, C denotes a chassis or body having associated with the forward end portion thereof, a front axle 5 of a floating type and preferably mounted in the manner set forth in my additional application executed on even date herewith.

Each end portion of the axle 5 has associated therewith a spindle 6 on which is mounted a front steering wheel 7. Coacting with the spindle 6 are the rearwardly directed spindle arms 8 operatively connected by a steering rod 9 so that both of the wheels 7 will have lateral swinging movement in unison and in the same general direction, as is well known. The desired lateral or steering movement is imparted to the wheels 7 in the well known manner upon proper operation of the steering wheel 10.

Positioned a desired distance rearwardly of the front axle 5 is a transversely disposed casing 15 in which are mounted in a conventional member the driving axles 16. to each of which is fixed, in a desired manner, a drive wheel 17. The opposite end portions of the front axle 5 and the casing 15 are connected by the brace or hitching rods 18, each of said rods having a universal connection, as at 19, with the front axle 5 and the casing 15, said connections 19 compensating for the vibrations incident to travel. The casing 15 is also preferably of a floating type and mounted in applied position in accordance with the disclosure contained in my additional application hereinbefore referred to.

Positioned a desired distance rearwardly of the casing 15 is a transversely disposed axle 24 and interposed between the axle 24 and the casing 15 is a brace and hitch member 25.

As herein disclosed, the member 25 is substantially V-shape and having the apex portion thereof in universal connection, as at 26, with the central portion of the casing 15, while the rear or free end portions of the member 25 are loosely coupled, as at 27, to the axle 24. This particular mounting of the member 25 is also for the purpose to compensate for undue vibration. This axle 24 is also preferably of a floating type. Each end portion of the axle 24 is also provided with a swinging spindle 28 and on which is mounted a ground engaging wheel 46. The spindles 28 are provided with the forwardly directed spindle arms 29, operatively engaged by a steering rod 30, whereby the spindles 28 are caused to swing in unison and in the same general direction. The central portion of the rod 30 is provided with a transversely disposed slot 11 through which is directed a pin or bolt 12. This bolt 12 as herein disclosed depends from the central portion of a transverse brace beam 14 comprised in the structure of the chassis or body C. The lower portion of the pin or bolt 12 is engaged through a rearwardly directed arm 20 carried by the lower end portion of a bracket 21 depending from the cross member or beam 14. In the event a further axle is arranged rearwardly of the axle 24, as is disclosed in my additional application executed on even date herewith, the arrangement of this additional axle and the parts concomitant thereto will be the same as set forth with respect to the axle 24. In this latter event, the steering arms will extend in the same general direction and be operatively connected with the steering arms 29, and said axle 24 will also be connected with this additional axle by suitable brace or hitch members.

In the form of my invention illustrated in Figure 5, the steering rod 30' has disposed through the transversely directed slot 11' the pin 12', which is carried by the forked member or clevis 1. The member or clevis 1 is integrally formed with the lower end portion of a rearwardly directed and downwardly curved arm 2, the forward end portion of said member or arm being suitably secured, as at 3, to the structure of the chassis or body C.

During the turning operation, the rear portion of the chassis or body C or C' will have lateral swinging movement, as is well known, in a direction opposite to that in which the turn is made and this movement will result in the pin 12 imparting movement to the rod 30, to cause the wheels 46 to have lateral turning movement in a direction opposite to that in which the forward end portion of the chassis or body C is turning, so that the rear portion of the chassis or body will travel in substantially the same path as the forward portion of the body during such turning or steering movement. This same result is accomplished with the structure as is particularly illustrated in Figure 5.

From the foregoing description it is thought to be obvious that a vehicle constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A vehicle comprising, in combination, a running gear having an intermediate axle and an axle at opposite sides thereof, ground engaging members carried by the opposite end portions of the intermediate axle, steering spindles carried by the opposite end portions of the second named axles, ground engaging members mounted upon the spindles, steering means associated with the spindles of one of the second named axles, a rod operatively connecting the spindles of the second of the last named axles for causing the wheels mounted thereon to move laterally in unison, a body supported by the axles and having lateral movement relative to the second named axles, and a rigid member depending from the frame adjacent the second of the last named axles, the rod connecting the spindles of said second of the last named axles being provided with a transversely disposed slot through which the rigid member is freely disposed.

In testimony whereof I hereunto affix my signature.

MARTIN J. FURLONG.